(12) United States Patent
Zhang

(10) Patent No.: US 7,493,731 B2
(45) Date of Patent: Feb. 24, 2009

(54) INSERT TYPE REMOVABLE BUILT MODEL

(76) Inventor: Changqing Zhang, Room 410, Building 44, No. 96, Jinzhai Road, Hefei City, Anhui Province, 230026 (CN)

( * ) Notice: Subject to any disclaimer, the term of this patent is extended or adjusted under 35 U.S.C. 154(b) by 976 days.

(21) Appl. No.: 10/478,784

(22) PCT Filed: May 24, 2002

(86) PCT No.: PCT/CN02/00350

§ 371 (c)(1),
(2), (4) Date: Jun. 11, 2004

(87) PCT Pub. No.: WO02/001690

PCT Pub. Date: Dec. 19, 2002

(65) Prior Publication Data

US 2004/0237420 A1    Dec. 2, 2004

(30) Foreign Application Priority Data

May 25, 2001  (CN) ............................. 01 2 24499.6
Feb. 10, 2002  (CN) ............................. 02 1 12664.X

(51) Int. Cl.
*E04B 2/00* (2006.01)
*E04B 1/38* (2006.01)

(52) U.S. Cl. .................... 52/270; 52/586.1; 52/284; 52/586.2; 52/585.1; 52/250; 52/261; 52/272

(58) Field of Classification Search ............... 52/586.1, 52/586.2, 585.1, 582.2, 270, 284, 285.1, 52/285.2, 285.4, 256, 257
See application file for complete search history.

(56) References Cited

U.S. PATENT DOCUMENTS

| 2,882,564 | A | * | 4/1959 | Couse et al. | .................. 52/465 |
| 2,924,858 | A | * | 2/1960 | Couse et al. | ............... 52/586.2 |
| 3,310,917 | A | * | 3/1967 | Simon | ........................ 52/91.1 |
| 3,348,459 | A | * | 10/1967 | Harvey | ........................ 404/35 |
| 3,363,383 | A | * | 1/1968 | La Barge | ...................... 52/471 |
| 4,161,977 | A | * | 7/1979 | Baslow | ....................... 160/381 |
| 4,774,794 | A | * | 10/1988 | Grieb | ........................ 52/309.7 |
| 5,058,333 | A | * | 10/1991 | Schwartz | ....................... 52/73 |
| 5,062,250 | A | * | 11/1991 | Buzzella | .................... 52/586.2 |
| 5,868,574 | A | | 2/1999 | Rabdle | |
| 5,901,521 | A | * | 5/1999 | Guy | ............................ 52/604 |
| 6,179,620 | B1 | | 1/2001 | Schmidt | |
| 6,763,643 | B1 | * | 7/2004 | Mårtensson | ................ 52/586.1 |
| 6,874,291 | B1 | * | 4/2005 | Weber | ....................... 52/586.1 |
| 7,340,868 | B2 | * | 3/2008 | Weber | ....................... 52/586.1 |

OTHER PUBLICATIONS

International Preliminary Examination Report of Oct. 17, 2002.

* cited by examiner

*Primary Examiner*—Jeanette Chapman
(74) *Attorney, Agent, or Firm*—Greenberg Traurig, LLP

(57) ABSTRACT

An insert type building model, comprising layer members, wall members and accessories such as doors and windows. Said layer members are jointed to one another with joint pieces embedded at jointing portions thereof. Said wall members include plate pieces and switchover pieces connected to each other in an embedment fashion. Said layer members are combined with said plate pieces and said switchover pieces in an embedment fashion.

15 Claims, 16 Drawing Sheets

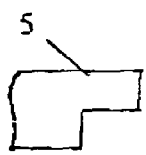 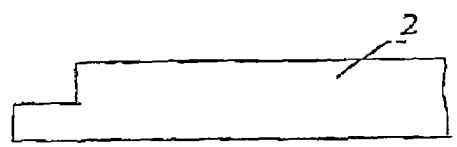
Fig.38    Fig.39
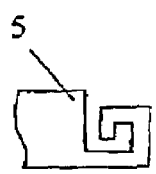 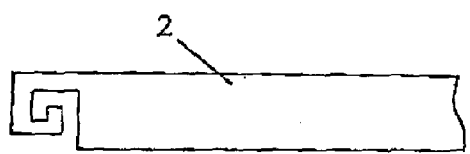
Fig.40    Fig.41
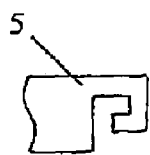 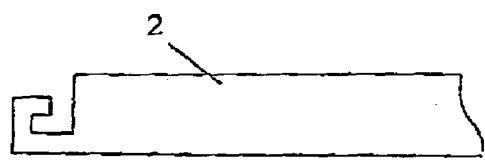
Fig.42    Fig.43
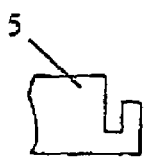 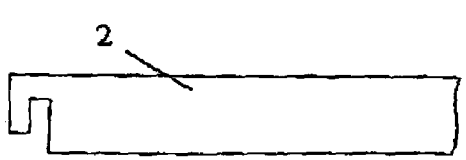
Fig.44    Fig.45

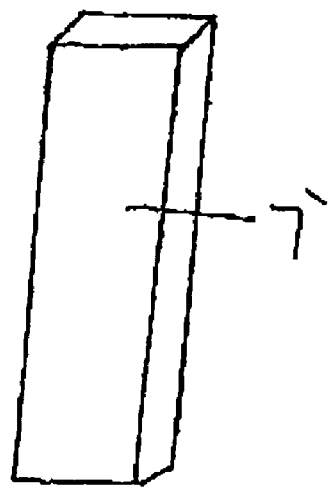
Fig.54
Fig.53

INSERT TYPE REMOVABLE BUILT MODEL

FIELD OF THE INVENTION

The present invention relates to a building model, and more particularly, to an insert type removable building model.

DESCRIPTION OF THE RELATED ART

Conventional micro and emulational building models have realistic appearance, but they can not be changed again once formed and they are not substantial.

SUMMARY OF THE INVENTION

The present invention has been made to solve at least one of the above-mentioned problems. Accordingly, the object of the present invention is to provide an insert type removable building model which is optionally adjustable to construct buildings with dimensions and shapes, easily constructed and has a firm structure while which has good emulational effect and aesthetic sense.

Additional aspects and advantages of the invention will be set forth in part in the description that follows, and in part, will be obvious from the description, or may be learned by the practice of the invention.

The object of the present invention is achieved by providing an insert type building model including layer members, wall members and accessories, for example, doors and windows.

said layer members are jointed to one another with joint pieces embedded at jointing portions thereof; said wall members including plate pieces and switchover pieces connected to each other in an embedment fashion; said layer members are combined with said plate pieces and said switchover pieces in an embedment fashion.

Preferably, said layer member is provided on each side thereof with a tenon which constitutes a H shape together with the corresponding side, and at upper and lower outer edges on each side thereof with extending engaging openings; the joint piece with which the layer members are engaged with each other is provided in bottom thereof a groove fitted on the tenon, and at top thereof with a projection fitted in the engaging opening; said plate piece and said switchover piece are engaged with each other in a convex-concave form, an engaging form, an abutting form or a hooking form; said plate piece is provided on upper and lower sides thereof with plate piece grooves fitted on the tenons of the layer member, or at upper and lower ends thereof with plate piece tenons or plane portions to be directly inserted into grooves formed by the engaging openings and the tenons of the layer member; said switchover piece is provided in upper and lower sides thereof with switchover piece grooves fitted on the tenons of the layer member, or at upper and lower ends thereof with switchover piece tenons or plane portions to be directly inserted into grooves formed by the engaging openings and the tenons of the layer member.

Preferably, said door and window accessories have outer sides of the door and window frames which are fitted with the plate pieces or the switchover pieces at the corresponding position in a tenon and mortise joint or a jointing method, engaging bars with a L-shaped cross section are extended along the outer sides of the door and window frames.

Alternatively, said layer member has separated tenons fitted with the layer members in a convex-concave form, a dovetail slot form or a T-shaped groove form.

Preferably, said layer member is provided at each side thereof with a groove or a tenon parallel to a layer plane along which said layer member is extended, an extended engaging opening or a extended flat surface is disposed at each of upper and lower edges on each side of the layer member, a layer connecting piece has a medial portion of a "–" shape, a "+" shape or a "T" shape, the layer connecting piece has two ends which are fitted with the layer member by using direct insertion, or using dovetail slots or T-shaped grooves, between the adjacent layer members formed by the adjacent layer members and the corresponding layer connecting piece are grooves or tenons engaged with the upper and lower tenons or grooves of the plate piece and the switchover piece.

Advantageously, said layer member has a tenon with a width equal to half of the width of a groove fitted therewith, between the two abutted or engaged layer members, their adjacent tenons are abutted against each other; the tenon of the outer side of the layer member is fitted with a tenon-mortise of a "–" shape or a "T" shape, or a H-shaped tenon-mortise bar with a groove width equal to half of its general width.

Alternatively, said layer member may be provided at each side thereof with a plurality of tenons at intervals so that the corresponding tenons between the engaged layer members are inserted into the corresponding intervals.

Preferably, said plate piece and the switchover are engaged with each other in a convex-concave form, or fitted with each other in a tenon and mortise joint; said tenons are of a strip shape, a column shape or a dentation shape; said corresponding mortises are of a strip shape, a column shape or a dentation shape corresponding to the shapes of the tenons.

Alternatively, said plate piece and said switchover piece are abutted against each other in a flat end surface, a L-shaped end surface or a stepped end surface.

Alternatively, said plate piece and said switchover piece may be integrally formed respectively, or they may be constructed respectively by engaging a plurality of pieces.

Advantageously, the tenon-mortise bar having a H-shaped cross section and a decorating piece for an outer wall are disposed so that one side of the H-shaped tenon-mortise bar is abutted against the tenon of the layer member and the decorating piece for an outer wall is inserted into a groove formed on one side of the groove of the H-shaped tenon-mortise bar by placing the plate piece and the switchover piece into the other side.

The present invention has following advantages.

1. The building model according to the present application is designed in structure in a real construction mode, and thus has an excellent simulation effect. The constructed building has a vivid configuration with the same rooms, verandas and eaves as a real building.

2. The building model according to the present application is easily constructed and disconnected, and has a firm structure since it is constructed by engaging the convex and concave interfaces of elements in conjunction with engaging elements such as the joint piece.

3. In the building model according to the present application, there may be components of different shapes to be selected so as to satisfy any requirement for the configuration of compartments, arrangement and height of floors and like.

4. The building model according to the present application can play an important role in real estate marketing due to its excellent simulation effect and the firm structure.

5. The building model according to the present application is easily constructed and disconnected, has components which may be of large size or small size, for example, the builder can carry out construction inside a big model. In addition, the building model can be built into buildings with different floors, spaces inside a room, shapes. During the construction of the model, decorations can be applied to its outer wall, doors and windows so that structures may be constructed in different fashions and styles. Furthermore, the mode can be further changed in fashion and style by using roofs, balustrades and colonnades.

6. A practical removable building can be achieved with appropriate material by using the structure of the present application. Components for different portions of a building can be designed so that the resultant building can be constructed and disconnected, achieving a dream of self-design and self-construction and moving house together with house.

7. The present invention can change the situation of a typical model of building structure in a stage background by constructing the background with components according the requirement for a scene.

8. The present invention may provide a building that can be designed and constructed by oneself into structures of different styles and sizes.

BRIEF DESCRIPTION OF THE DRAWINGS

The above and other features and advantages of the present invention will become more apparent by describing in detail exemplary embodiments thereof with reference to the attached drawings in which:

FIGS. 38-39 are views schematically showing the structure of a switchover piece and a plate piece which are abutted against each other, used in a building model according to another embodiment of the present invention;

FIGS. 40-41 are views schematically showing the structure of a switchover piece and a plate piece fitted with each other in a hooking form, used in a building model according to an embodiment of the present invention;

FIGS. 42-43 are views schematically showing the structure of a switchover piece and a plate piece fitted with each other in a hooking form, used in a building model according to another embodiment of the present invention;

FIGS. 44-45 are views schematically showing the structure of a switchover piece and a plate piece fitted with each other in a hooking form, used in a building model according to yet another embodiment of the present invention;

FIGS. 53-54 are views schematically showing a inserting plate and a column tenon for connection switchover pieces and plate pieces, used in a building model according to an embodiment of the present invention.

DETAILED DESCRIPTION OF THE PREFERRED EMBODIMENTS

Figure 1:
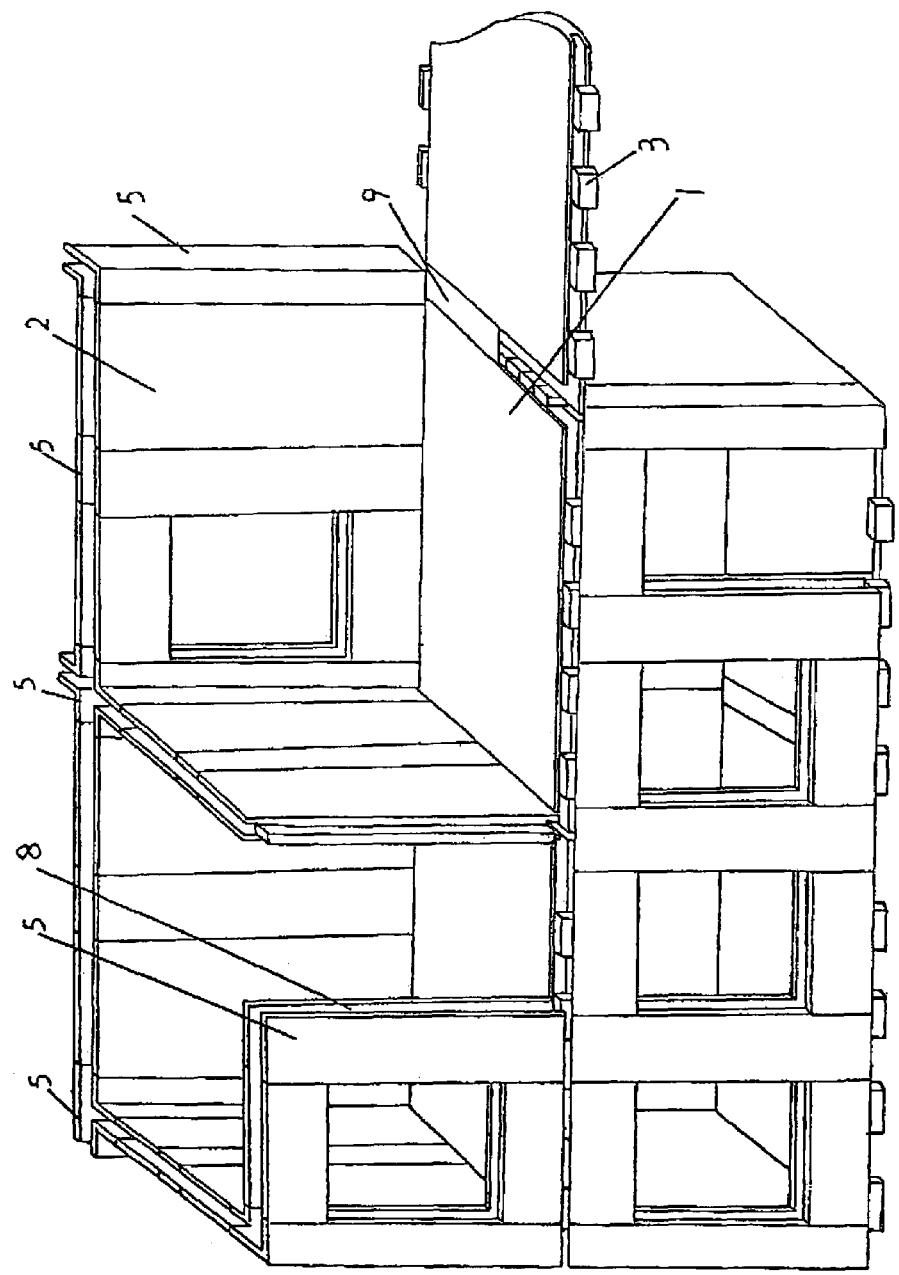
FIG. 1 is a perspective view schematically showing a structure constructed by some of the components used in a building model according to an embodiment of the present invention.

Reference will now be made in detail to the preferred embodiments of the present invention, examples of which are illustrated in the accompanying drawings, wherein like reference numerals refer to like elements throughout.

Referring to the FIG. 1, an insert type building model according to an embodiment of the present invention includes layer members 1, wall members comprising plate pieces 2 and switchover pieces 5.

Figure 2:
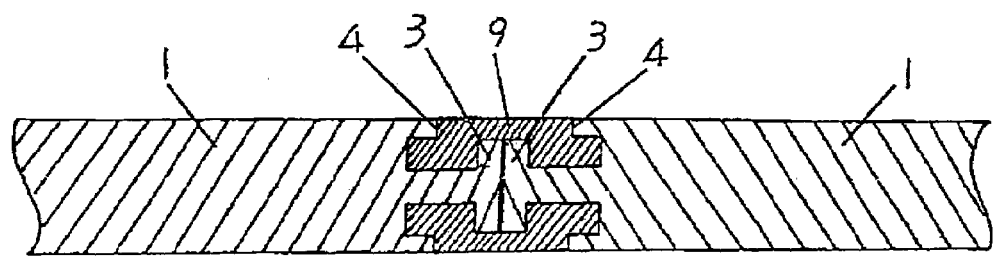
FIG. 2 is a cross sectional view schematically showing the engagement of two layer members used in a building model according to an embodiment of the present invention.

Referring to the FIG. 2, said layer member 1 according to an embodiment of the present invention is provided on each side thereof with a tenon 3 which is perpendicular to a layer plane along which said layer member is extended and which constitutes a H shape together with the corresponding side of the layer member when viewed in a crossectioal section of the layer member, the layer member is provided at upper and lower outer edges on each side thereof with extending engaging openings 4; the layer members 1 are abutted against each other with a joint piece 9 inserted therebetween; the joint piece 9 is provided in bottom thereof a groove fitted on the tenon 3, and at top thereof with a projection fitted in the engaging opening 4.

Figure 3:
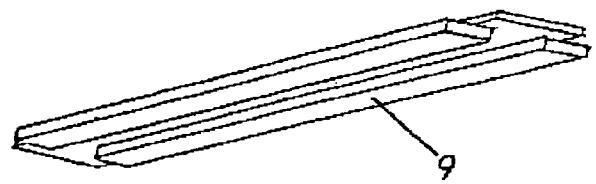
FIG. 3 is a perspective view schematically showing a joint piece used in a building model according to an embodiment of the present invention.

Referring to the FIG. 3, at each end of the joint piece 9, there is an upper portion projected further than the corresponding lower portion as shown in the FIG. 3, so as to ensure the integrity of a layer formed by the layer members.

Figure 4:
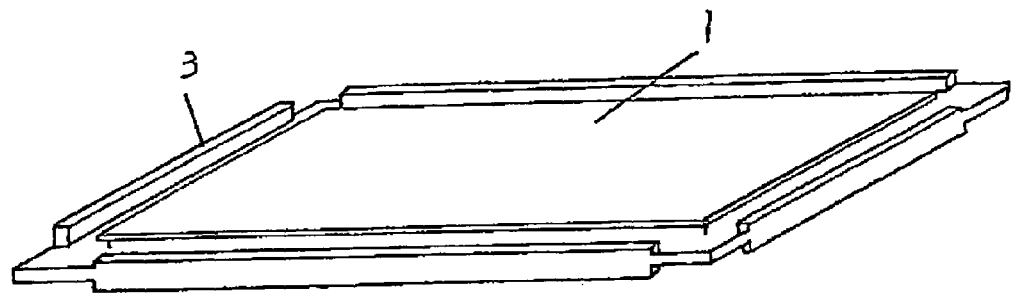
FIG. 4 is a perspective view schematically showing a layer member used in a building model according to an embodiment of the present invention.
Figure 5:
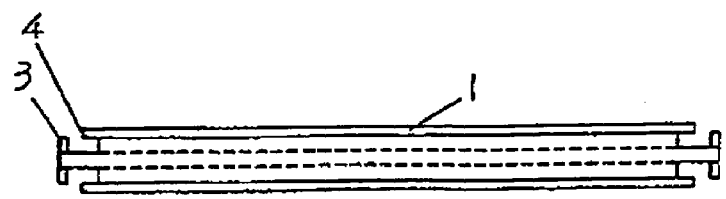
FIG. 5 is the front view of the layer member of FIG. 4.
Figure 46:
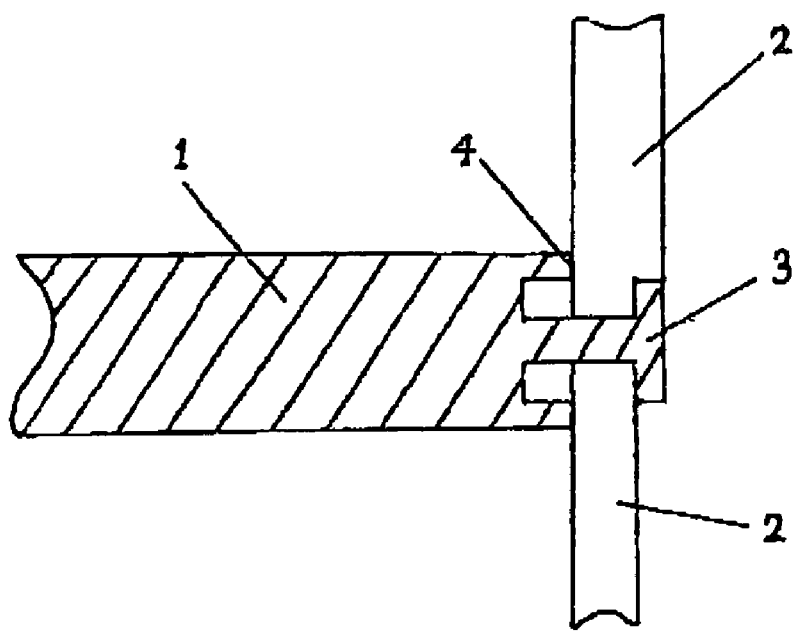
FIG. 46 is view schematically showing the structure of the lower tenon and the plane portion of the plate pieces directly inserted into grooves formed by the engaging openings and the tenons of the layer member, used in a building model according to an embodiment of the present invention.
Figure 47:
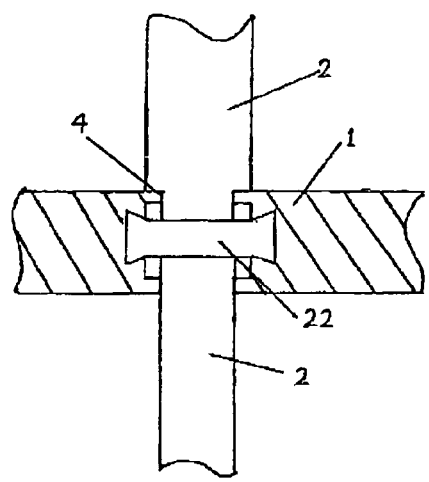
FIGS. 47-52 are views schematically showing the connecting structures of layer members, connecting pieces, switchover pieces and plate pieces, used in a building model according to an embodiment of the present invention.
Figure 48:
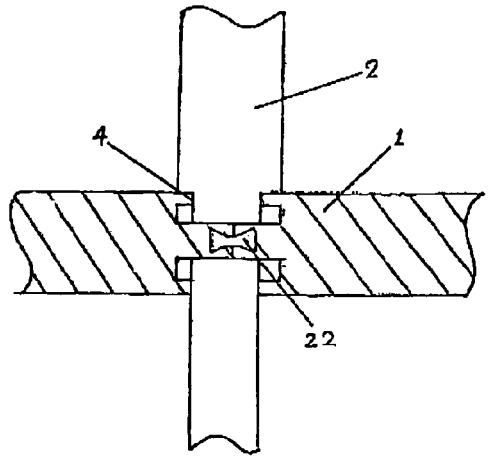
Figure 49:
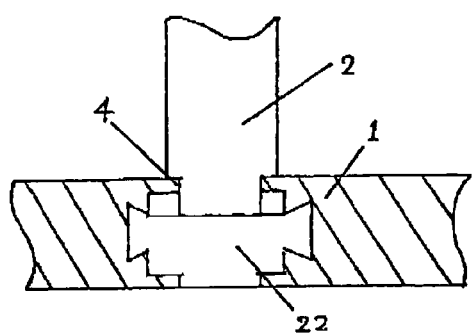
Figure 50:
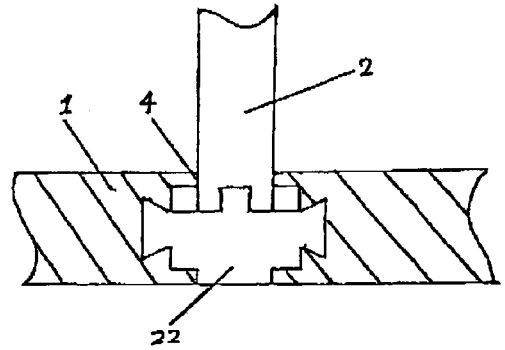
Figure 51:
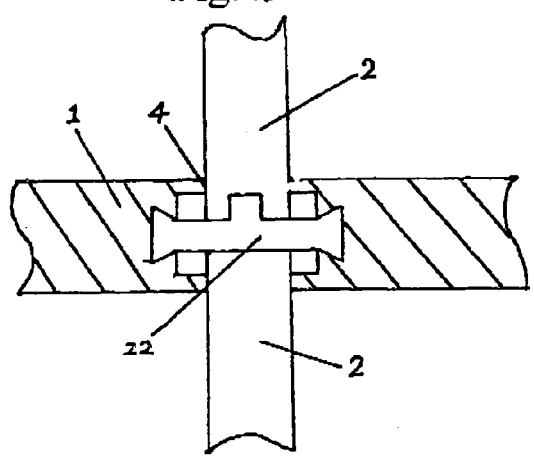

Referring to the FIGS. 4, 5, the layer member 1 according to the embodiment has a tenon 3 with a width equal to half of the width of a groove of the joint piece 9 fitted therewith, the fitting portion of the tenon 3 having a height not more than the depth of the groove of the joint piece 9. As shown in the FIG. 11, after the tenons 3 of layer members 3 on adjacent side are abutted against one another, the abutted layer members 3 are fitted with the corresponding bottom groove of the joint piece 9 or a plate piece groove 6 of the plate piece 2 or a switchover piece groove 8 of the switchover piece 5. Corresponding to this structure, in the case where the layer member 1 and the plate piece 2 are engaged with each other at an outer wall portion of the building model, a tenon-mortise bar 10 with a width equal to that of the tenon 3 of the layer member 1 is provided. Specifically, after abutting the tenon-mortise bar 10 against the tenon 3 at the outer wall portion, the plate piece 2 and the switchover piece 5 are fitted on the tenon 3 abutted with the tenon-mortise bar 10. Preferably, said plate piece 2 is provided at upper and lower ends thereof with plate piece tenons or even with plane portions to be directly inserted into grooves formed by the engaging openings and the tenons of the layer member, as shown in the FIG. 46.

Figure 6:
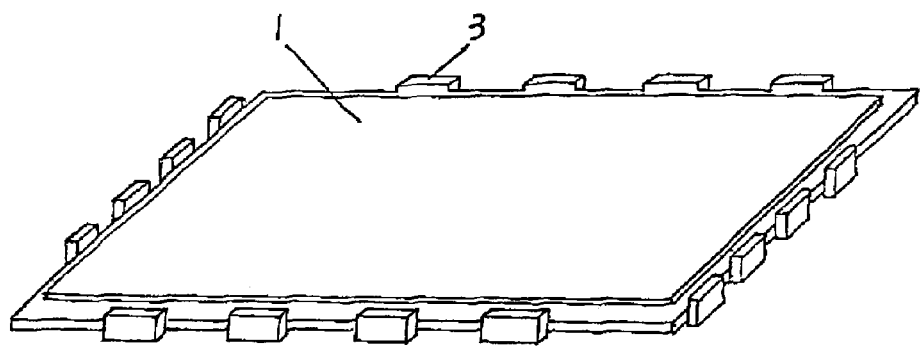
FIG. 6 is a perspective view schematically showing a layer member used in a building model according to another embodiment of the present invention.
Figure 7:
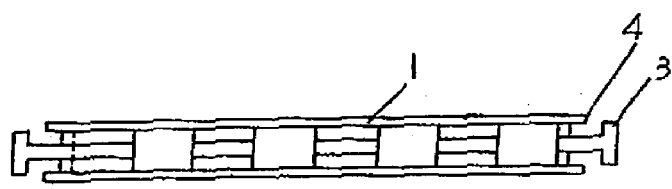
FIG. 7 is the front view of the layer member of FIG. 6.

The tenon 3 of the layer member 1 may be formed in the other forms, as shown in the FIGS. 6, 7, for example, a plurality of tenons 3 are disposed at intervals with the spaces formed by the cutted portions of the tenon 3 more than or equal to the corresponding remained portions of the tenon 3 of the other layer member 1 fitted therewith.

Figure 12:
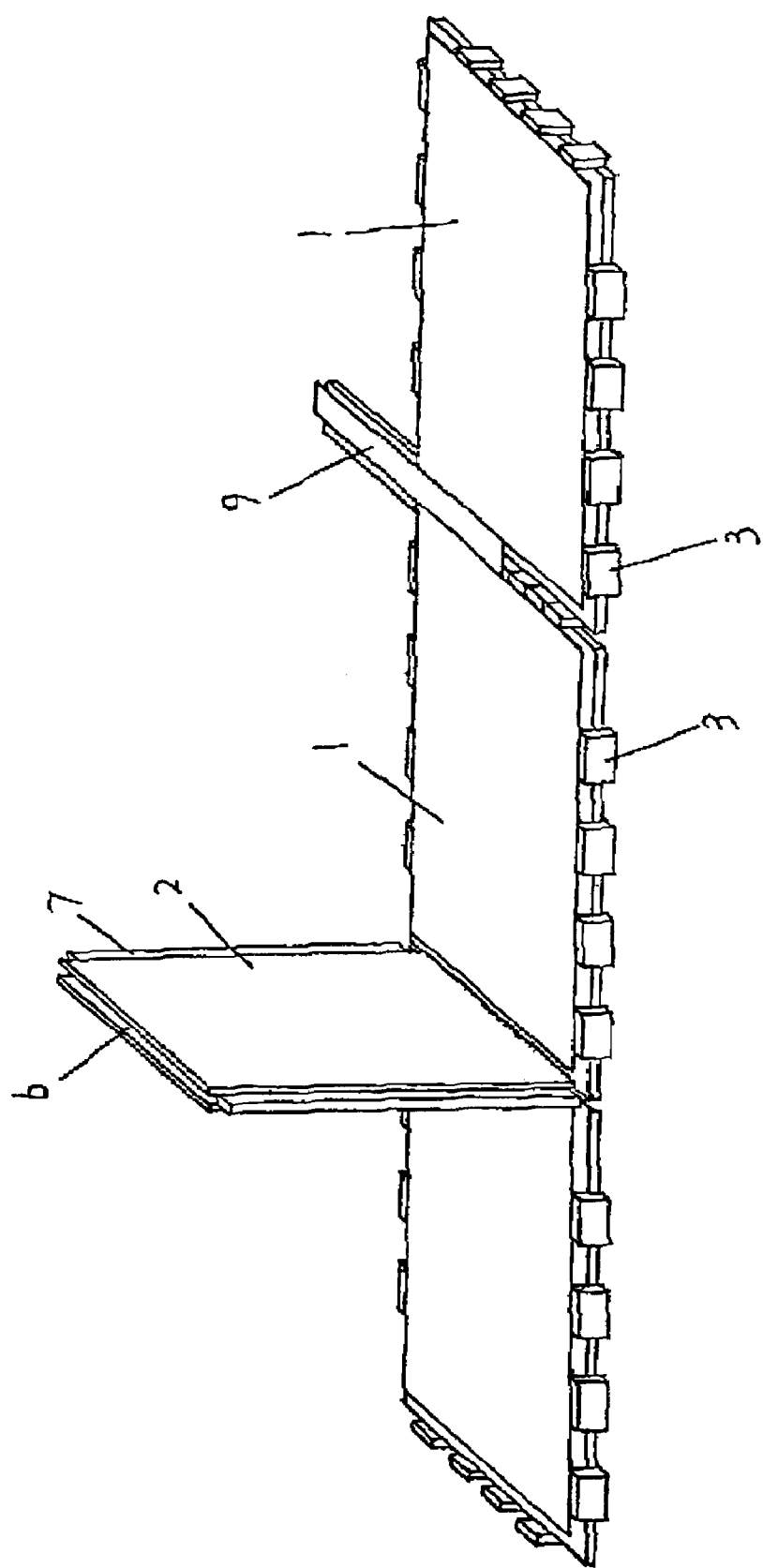
FIG. 12 is a perspective view schematically showing the engagement between the layer members of FIG. 6 and the plate piece member of FIG. 8.

In this structure, the tenon 3 of the layer member 1 has the same width as that of a groove fitted thereon, as shown in the FIG. 12. Between the two abutted or engaged layer members 1, their tenons 3 on the adjacent side are inserted into the corresponding intervals, and then the joint piece 9 or the plate piece 2 and switchover piece 5 are fitted on the inserted tenons 3.

Figures 23, 24:
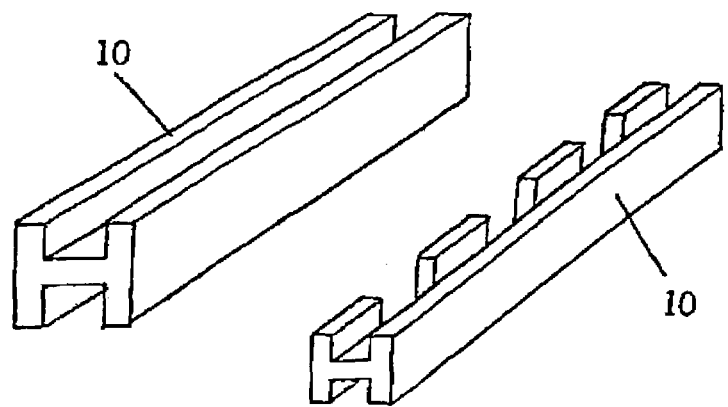
FIGS. 23-24 are perspective views schematically showing tenon-mortise bars in different structures for inserting therein a decorating piece for an outer wall, used in a building model according to an embodiment of the present invention.
Figure 25:
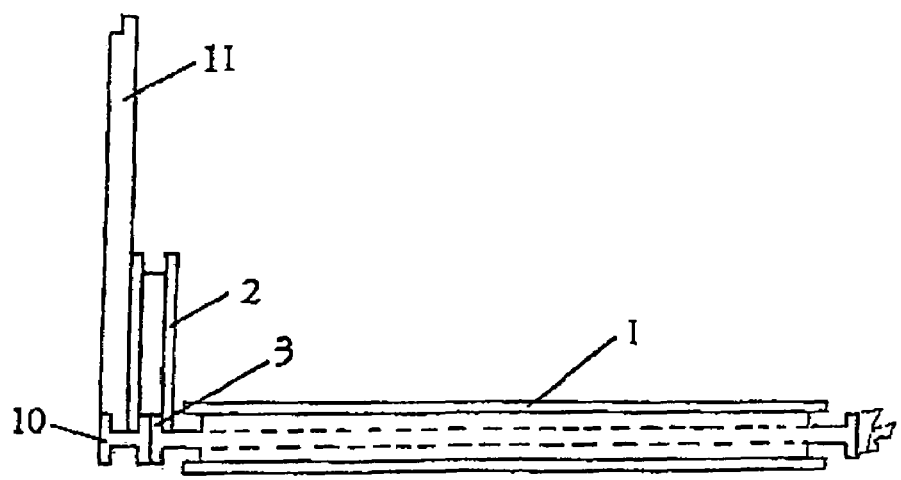
FIGS. 25 is a view schematically showing a state of the tenon-mortise bar in use.

Preferably, for the purpose of facilitation of decoration on the outer wall of the building model, the model is further disposed with tenon-mortise bars 10 having a H-shaped cross section and a decorating piece 11 for an outer wall, as shown in the FIGS. 23 and 24. The tenon-mortise bar 10 is fitted with the other components in such way that one side of the H-shaped tenon-mortise bar 10 is abutted against the tenon 3 of the layer member 1 to insert thereon the plate piece 2 and the switchover piece 5, as shown in the FIG. 25. The decorating piece 11 for an outer wall is inserted into a groove formed on one side in the groove of the H-shaped tenon-mortise bar 10 with the plate piece 2 and the switchover piece 5 placed into the other side. Both upper and lower sides of the H-shaped tenon-mortise bar 10 may be used. This structure facilitates the decoration on the outer wall with arbitrary changes.

Figure 8:
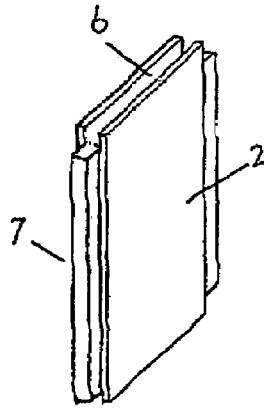
FIG. 8 is a perspective view schematically showing a plate piece used in a building model according to an embodiment of the present invention.
Figure 9:
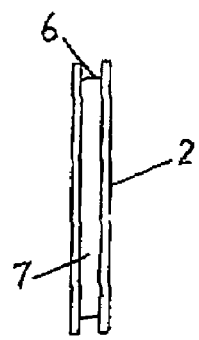
FIG. 9 is the side view of the plate piece member of FIG. 8.
Figure 10:
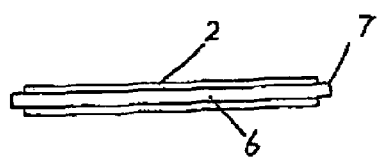
FIG. 10 is the plan view of the plate piece of FIG. 8.

Referring to the FIGS. 8-10, the plate piece 2 according to the embodiment is provided in upper and lower sides thereof with plate piece grooves 6 fitted on the layer member tenon 3 and a portion of the door and window accessories, and on left and right sides thereof with plate piece tenons 7. Alternatively, in order to make the building model more firm than those mentioned above, the plate piece tenons 7 can be formed in the other structures such as a dovetail slot form. Accordingly, the other components engaged with the plate piece tenons 7, such as the switchover pieces 5, are shaped so as to be fitted with the plate piece tenons 7.

Figure 11:
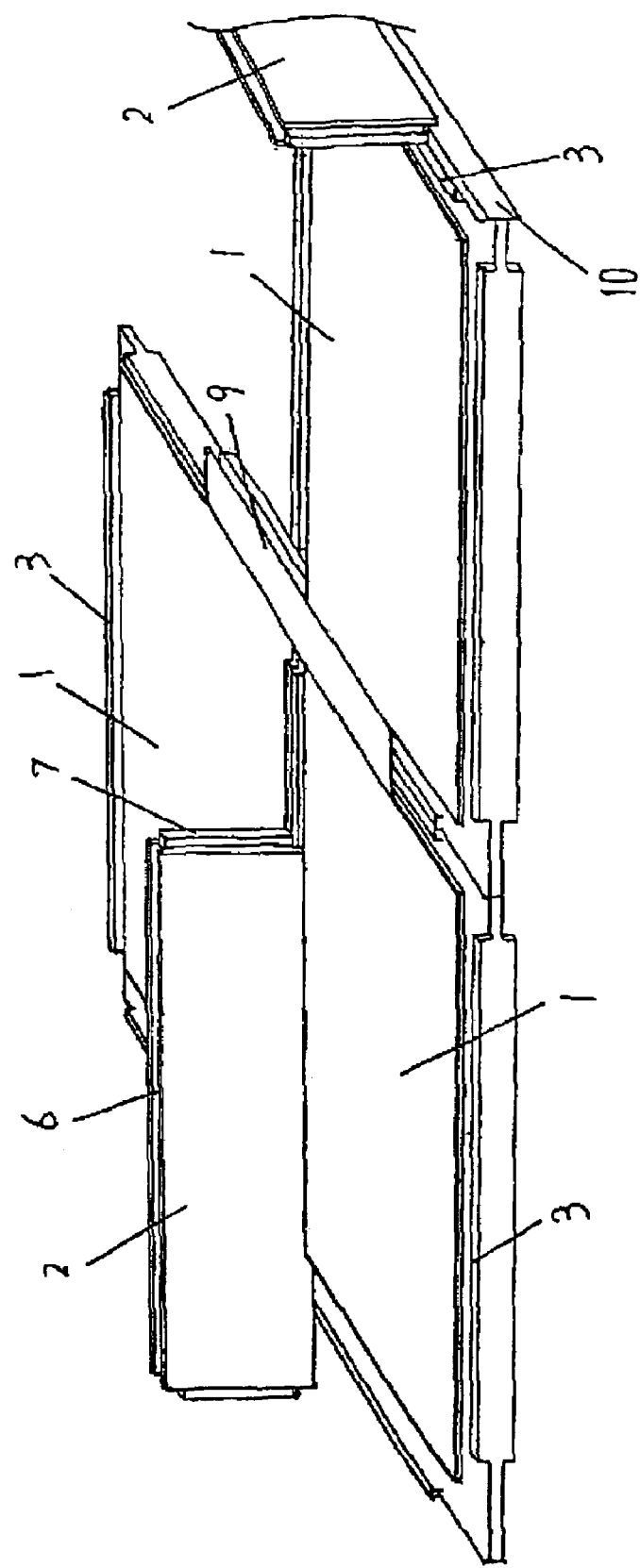
FIG. 11 is a perspective view schematically showing the engagement between the layer members of FIG. 4 and the plate pieces member of FIG. 8.

Referring to the FIGS. 11 and 12, the plate piece 2 in the embodiment is engaged with the layer members 1 with the plate piece grooves 6 in the upper and lower sides of the plate piece 2 fitted on the layer member tenons 3.

Figures 13, 14:
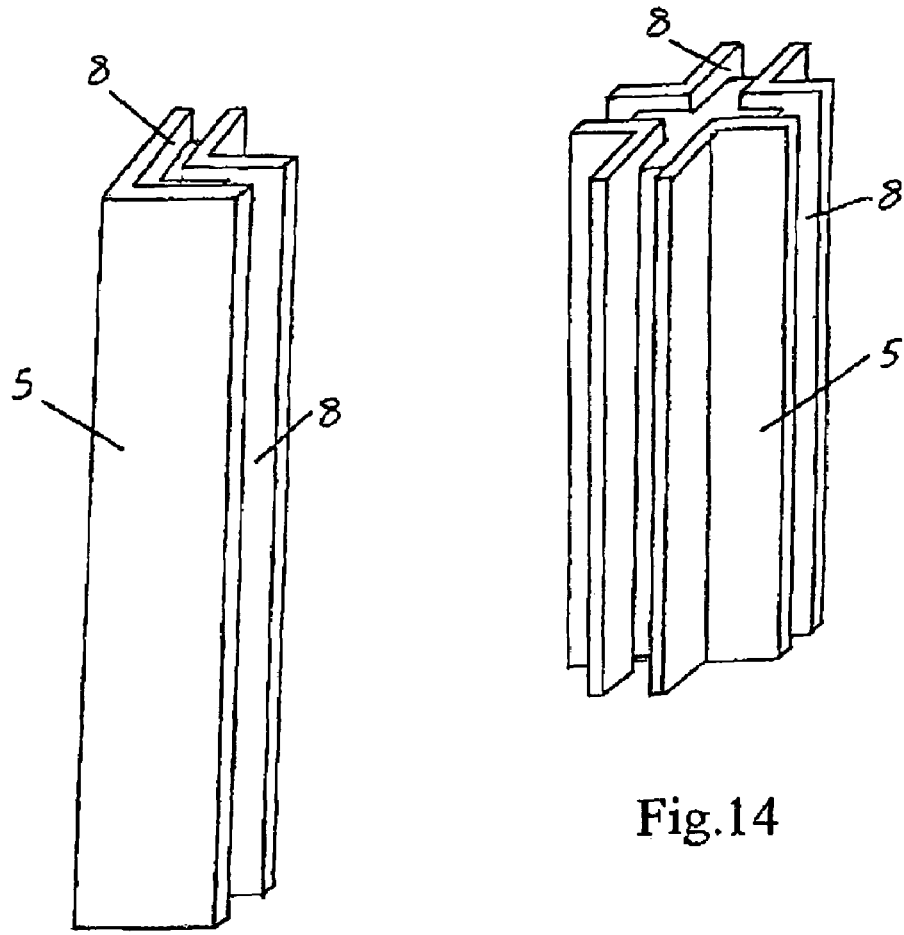
FIG. 13 is a perspective view schematically showing a switchover piece used in a building model according to an embodiment of the present invention.
FIG. 14 is a perspective view schematically showing another switchover piece used in a building model according to an embodiment of the present invention.
Figure 15:
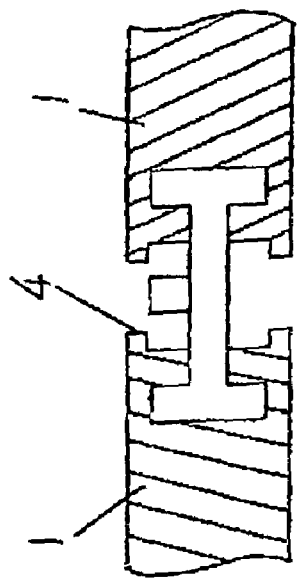
FIGS. 15-18 are perspective views schematically showing layer members and connecting pieces in different structures used in a building model according to an embodiment of the present invention.
Figure 16:
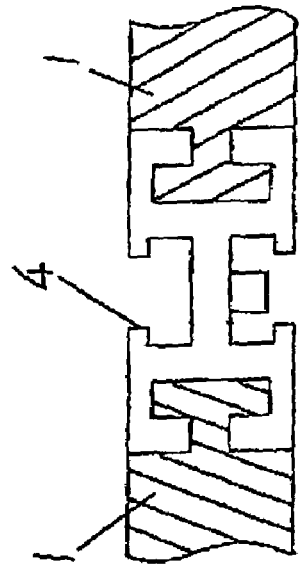
Figure 17:
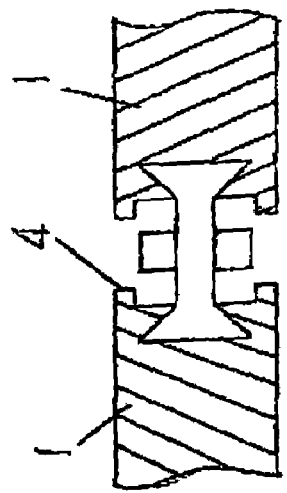
Figure 18:
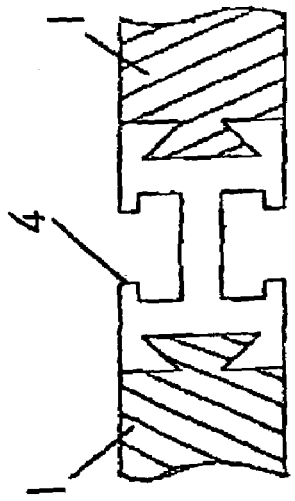
Figure 19:
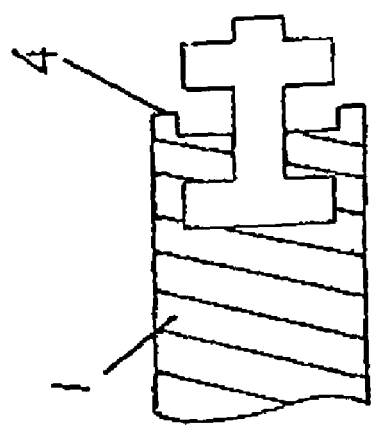
FIGS. 19-22 are perspective views schematically showing the other layer members and connecting pieces used in a building model according to an embodiment of the present invention.
Figure 20:
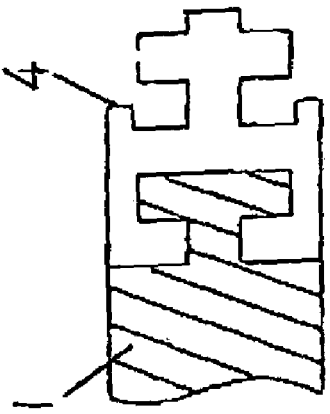
Figure 21:
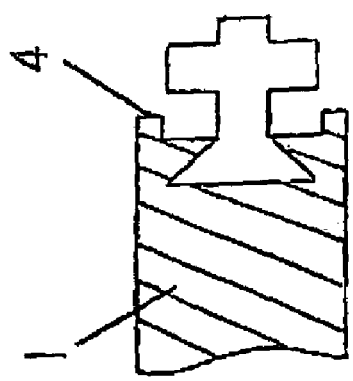
Figure 22:
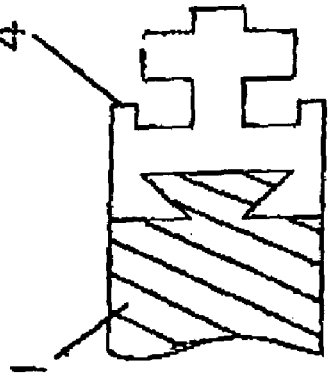

In the embodiment, a switchover piece groove 8 is formed in each of the top, bottom, left and right sides of switchover piece 5, as shown in FIG. 13, the switchover piece grooves 8 in the left and right sides being fitted with the plate piece tenons 7 of a strip shape, the switchover piece grooves 8 in the top and bottom sides being engaged with the layer member tenons 3, as shown in the FIG. 1.

The switchover piece 5 may be formed in different forms, for example, a switchover piece for 90-degree transition in the FIG. 13, a switchover piece for cross transition in the FIG. 14. In addition, there are also switchover pieces having a "–" shape, a "T" shape a "Y" shape and the like to be adapted to the transition between plate pieces 2 at different portions of the building model, as shown in the FIG. 1.

Referring to FIGS. 15-18, the layer members formed in the other forms may be connected therebetween by connecting pieces having a medial portion of a "–" shape, a "+" shape or "T" shape.

The plane portions, tenons or grooves of the plate piece and the switchover piece are engaged with tenons or grooves formed between the layer members by connecting the layer members with connecting pieces 22, as shown in the FIGS. 47-51.

Figure 52:
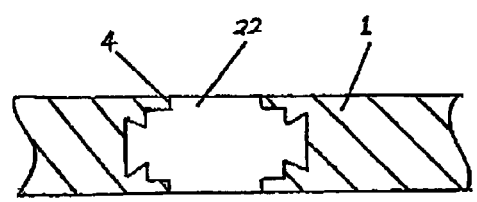

The layer members 1 may be connected therebetween with each other by a connecting piece 22 of a "+" shape as shown in the FIG. 52.

In addition, for connection in the outer wall portions of the building model, the model is further provided with the tenons 3 or the connecting pieces as shown in the FIGS. 19-22, corresponding to the separated tenons 3 or the connecting pieces shown in the FIGS. 15-18. This structure ensures the outer wall to be flat.

Figure 26:
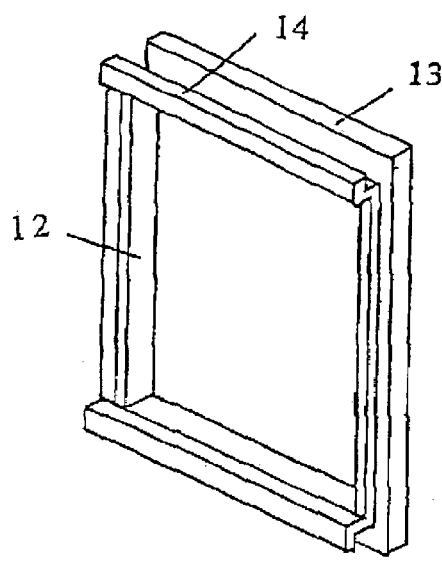
FIG. 26 is a perspective view schematically showing a window frame used in a building model according to an embodiment of the present invention.
Figure 27:
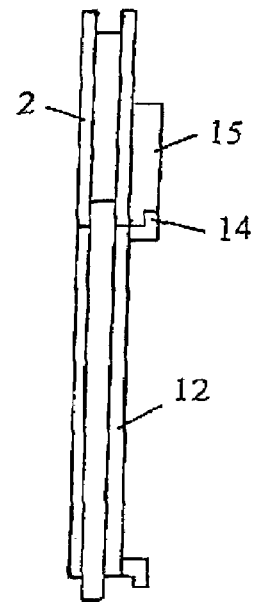
FIG. 27 is a side view schematically showing the tenon and mortise joint structure between the window frame and a wall member and a decorating piece for the window frame, used in a building model according to an embodiment of the present invention.

In an embodiment, door and window accessories is provided in the building model. The window frames 12 in the FIGS. 26 and 27 is provided at its left, right, upper and lower sides with window tenons 13 fitted with the switchover pieces 5 and the plate pieces 3. Engaging bars 14 with a L-shaped cross section are extended along the outer sides of the window frame to decorate the outer sides of the window frame. A window frame decorating piece 15 having structure corresponding to that of the engaging bar 14 is inserted into the engaging bar 14 to decorate the outside of the window- This structure facilitates the replacement of the window frame decorating pieces as the structure for decorating the outer wall. The door may be provided at corresponding portion thereof with engaging bars 14 with a L-shaped cross section to decorate the outsides of the door. The door frame has the same left, right and upper portions as those of the window frame, and in bottom thereof a groove fitted with the layer member tenons 3.

In an embodiment, said plate piece 2 and the switchover 5 may be engaged with each other in a convex-concave form, a abutting form, a hooking form or in a combining fashion consisting of the above forms. The plate piece grooves 6 fitted on the layer member tenons 3 are disposed in the upper and lower sides of the plate piece 2, while the switchover piece grooves 8 fitted on the layer member tenons 3 are formed in the top and bottom surfaces of the switchover piece 5.

Figure 28:
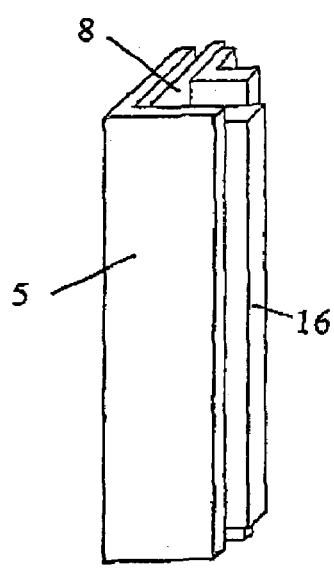
FIGS. 28-29 are perspective views schematically showing a switchover piece and a plate piece fitted with each other in a convex-concave form, used in a building model according to an embodiment of the present invention.
Figure 29:
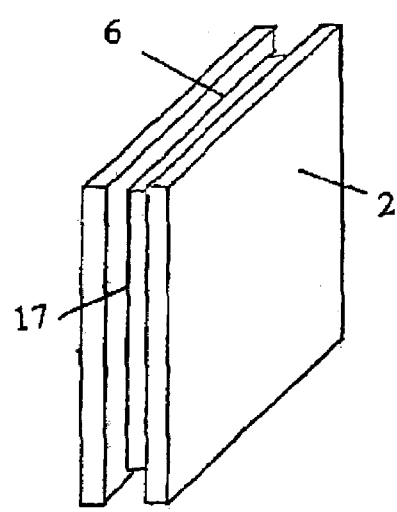
Figure 30:
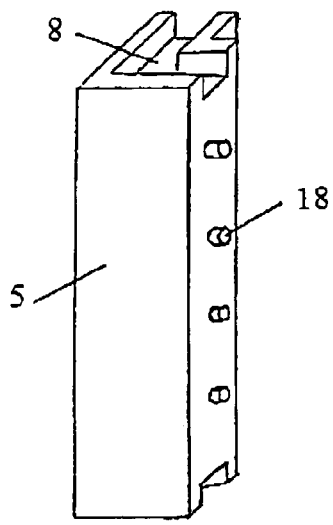
FIGS. 30-33 are perspective views schematically showing the structure of a switchover piece and a plate piece fitted with each other in a convex-concave form, used in a building model according to another embodiment of the present invention.
Figure 31:
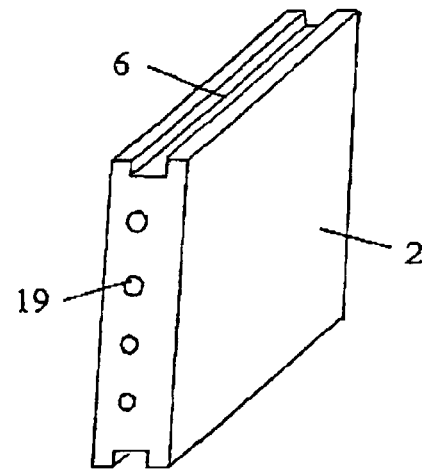
Figure 32:
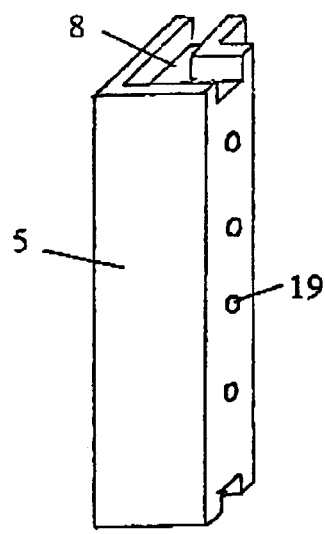
Figure 33:
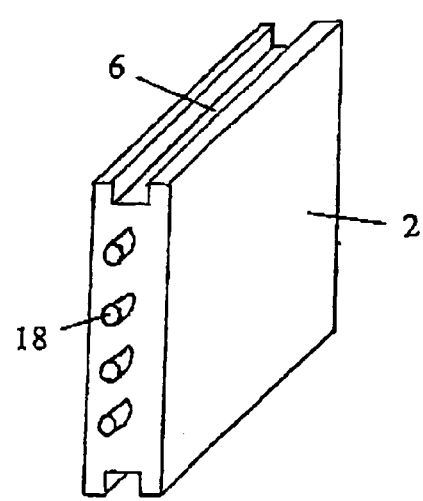

The convex-concave connecting structure between the plate piece 2 and the switchover piece 5 may be achieved by the engagement between strip tenons 16 and the corresponding strip grooves 17 as shown in the FIGS. 28-29.

Further, the convex-concave connecting structure between the plate piece 2 and the switchover piece 5 may be achieved by the engagement between column tenons 18 and the corresponding column grooves 19 as shown in the FIGS. 30-33.

Figure 34:
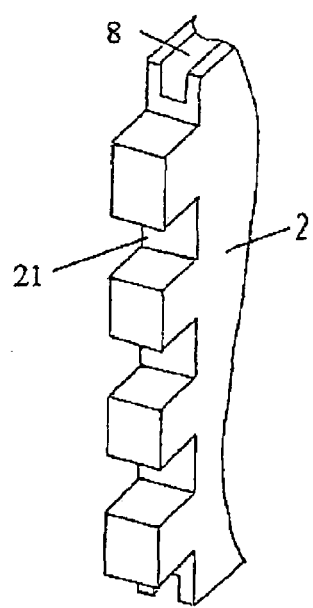
FIGS. 34-35 are perspective views schematically showing the structure of a switchover piece and a plate piece fitted with each other in a convex-concave form, used in a building model according to yet another embodiment of the present invention.
Figure 35:
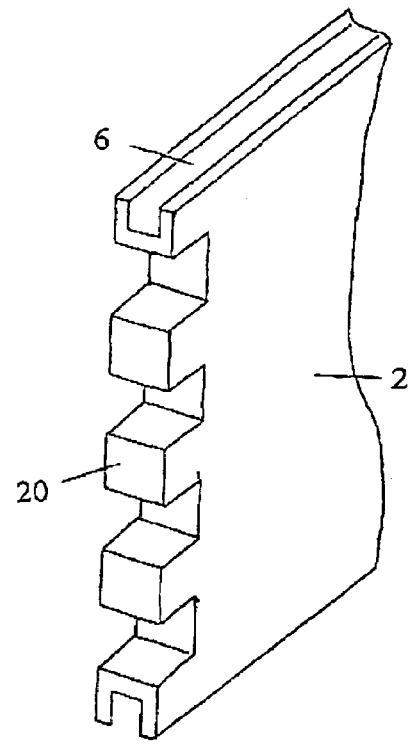

Alternatively, the convex-concave connecting structure between the plate piece 2 and the switchover piece 5 may be achieved by the engagement between dentate tenons 20 and the corresponding dentate grooves 21 as shown in the FIGS. 34-35.

Figure 36:
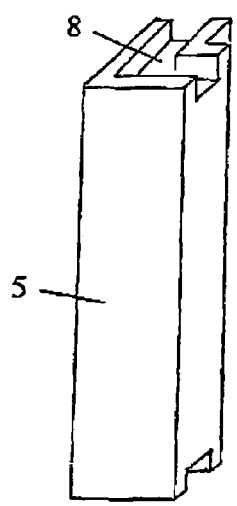
FIGS. 36-37 are perspective views schematically showing the structure of a switchover piece and a plate piece which are abutted against each other, used in a building model according to an embodiment of the present invention.
Figure 37:
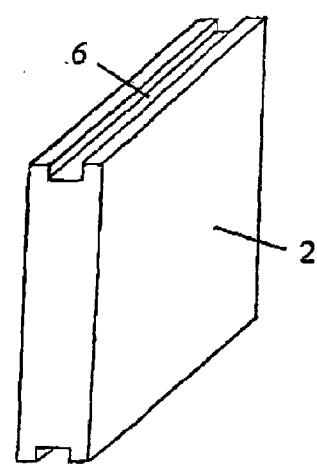

Advantageously, the abutting connection between the plate piece 2 and the switchover piece 5 may be achieved by contact between flat surfaces as shown in the FIGS. 36 and 37.

In addition, the abutting connection between the plate piece 2 and the switchover piece 5 may be achieved by contact between end surfaces with a "L" shape or a stepped shape as shown in the FIGS. 38 and 39.

Further, the plate piece 2 and the switchover piece 5 may be fitted with each other in a hooking form as shown in the FIGS. 40-45.

Referring to FIGS. 8, 13, 28, 29 and 53, in an embodiment according to present application, the plate piece tenons 7 and the plate piece 2 may be formed separately, and the tenons 16 and the switchover piece 5 may also be formed separately, that is, a separate strip inserting plate 7' is formed to connect the plate piece 2 and the switchover piece 5. The plate piece 2 and the switchover piece 5 are provided on the sides thereof with strip grooves 17 and 8 corresponding to the strip inserting plate 7'. The plate piece 2 and the switchover piece 5 are connected with each other by inserting the strip inserting plate 7' into the adjacent strip grooves 17 and 8 of the plate piece 2 and the switchover piece 5. Preferably, the strip grooves 17 and 8 have a depth equal to a half of the width of the strip inserting plate 7', so that a half of the strip inserting plate 7' in width direction thereof is inserted into the strip grooves 8 on the side of the switchover piece 5 while the other half of the strip inserting plate 7' is inserted into the strip grooves 17 on the side of the plate piece 2, thereby, the plate piece 2 and the switchover piece 5 are coupled to each other.

Referring to FIGS. 30-33 and 54, in an embodiment according to present application, the column tenons 18 and the plate piece 2 may be formed separately, and the column tenons 18 and the switchover piece 5 may also be formed separately, that is, the separate column tenons 18 are formed to connect the plate piece 2 and the switchover piece 5. The plate piece 2 and the switchover piece 5 are provided on the sides thereof with column grooves 19 corresponding to the column tenons 18. The plate piece 2 and the switchover piece 5 are connected with each other by inserting the column tenons 18 into the corresponding column grooves 19 of the plate piece 2 and the switchover piece 5. Preferably, the column grooves 19 have a depth equal to a half of the length of the column tenons 18, so that a half of the column tenons 18 in length direction thereof is inserted into the column grooves 19 on the side of the switchover piece 5 while the other half of of the column tenons 18 is inserted into column grooves 19 on the side of the plate piece 2, thereby, the plate piece 2 and the switchover piece 5 are coupled to each other.

The plate piece 2 and the switchover piece 5 can be formed integrally, or can be constituted by using a plurality of separate pieces. In addition, each of the plate piece 2 and the switchover piece 5 can be formed integrally, or can be constituted by using a plurality of separate pieces.

As a part of the wall of the building model, the above the convex-concave connecting structure, the abutting connection, the hooking form and their combination may be applied to connection between the door and windows accessories and the plate pieces and the switchover pieces. It is obvious that the above connection forms recited with respect to particular components can be used for connecting other components of the building model of the present application, that is, the above connection forms are not limited to specified components. For example, the connection modes for connecting the plate piece 2 and the switchover piece 5 can be used for coupling the layer members therebetween, while the connection modes between the layer members can also be used for connecting the plate piece 2 and the switchover piece 5.

Alternatively, in order to facilitate arrangement of wires, paths for wires are arranged in components of the building model such as the layer members, the wall members, so that lighting of indoor or outdoor can be provided for enhancing aesthetic feeling.

Although the present invention has been particularly shown and described with reference to exemplary embodiments thereof, the present invention should not be limited to the above embodiments, it would be appreciated by those skilled in the art that changes may be made in the embodiments without departing from the principles and spirit of the invention, the scope of which is defined in the claims and their equivalents.

What is claimed is:

1. An insert type building model, comprising layer members and wall members, wherein said layer members are abutted against one another with joint pieces embedded at jointing portions thereof; said wall members including plate pieces and switchover pieces connected to each other in an embedment fashion; said layer members are combined with said plate pieces and said switchover pieces of the wall members in an embedment fashion, wherein each of said layer members abutted against one another is provided on each side thereof with a tenon which constitutes a H shape together with the corresponding side when viewed in the cross section of the layer member, and at upper and lower outer edges on each side thereof with extending engaging openings; the joint piece with which the layer members are engaged with each other is provided in bottom thereof a groove fitted on the tenon, and at top thereof with a projection fitted in the engaging opening.

2. The insert type building model according to the claim 1, wherein said plate piece is provided on upper and lower sides thereof with plate piece grooves fitted on the tenons of the layer member.

3. The insert type building model according to the claim 1, wherein said type building model further comprising door and window accessories, said door and window accessories have outer sides of the door and window frames which are fitted with the plate pieces in a tenon and mortise joint, engaging bars with a L-shaped cross section are extended along the outer sides of the door and window frames.

4. The insert type building model according to the claim 1, wherein said layer member has the tenon with a width equal to half of the width of the groove fitted therewith.

5. The insert type building model according to the claim 1, wherein said layer member is provided at each side thereof with a plurality of tenons at intervals.

6. The insert type building model according to the claim 1, wherein said plate piece and the switchover are engaged with each other in a convex-concave form.

7. The insert type building model according to the claim 1, wherein said plate piece and said switchover piece are abutted against each other with one of a flat end surface, a L-shaped end surface and a stepped end surface.

8. The insert type building model according to the claim 1, wherein said plate piece and said switchover piece are integrally formed respectively.

9. The insert type building model according to the claim 1 wherein the tenon-mortise bar having a H-shaped cross section and a decorating piece for an outer wall are disposed so that one side of the H-shaped tenon-mortise bar is abutted against the tenon of the layer member and the decorating piece for an outer wall is inserted into a groove formed on one side of the groove of the H-shaped tenon-mortise bar by placing the plate piece and the switchover piece into the other side.

10. The insert type building model according to the claim 1, wherein said plate piece is provided at upper and lower ends thereof with one of a plate piece tenon and a plane portion, the one of a plate piece tenon and a plane portion to be directly inserted into grooves formed by the engaging openings and the tenons of the layer member.

11. The insert type building model according to the claim 1, wherein said switchover piece is provided in upper and lower sides thereof with switchover piece grooves fitted on the tenons of the layer member.

12. The insert type building model according to the claim 1, wherein said switchover piece is provided at upper and lower ends thereof with one of a switchover piece tenon and a plane portion, the one of a switchover piece tenon and a plane portion to be directly inserted into grooves formed by the engaging openings and the tenons of the layer member.

13. The insert type building model according to the claim 1, wherein the said type building model further comprising door and window accessories, said door and window accessories have outer sides of the door and window frames which are fitted with the switchover pieces in a tenon and mortise joint, engaging bars with a L-shaped cross section are extended along the outer sides of the door and window frames.

14. The insert type building model according to the claim 1, wherein said plate piece and the switchover are fitted with each other in a tenon and mortise joint.

15. The insert type building model according to the claim 1, wherein said plate piece and said switchover piece are constructed respectively by engaging a plurality of pieces.

* * * * *